(12) United States Patent
Yasuhara et al.

(10) Patent No.: US 8,002,338 B2
(45) Date of Patent: Aug. 23, 2011

(54) FRONT VEHICLE BODY STRUCTURE

(75) Inventors: Shigeto Yasuhara, Wako (JP); Yuji Matsuura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 12/626,050

(22) Filed: Nov. 25, 2009

(65) Prior Publication Data

US 2010/0127531 A1    May 27, 2010

(30) Foreign Application Priority Data

Nov. 25, 2008   (JP) ................................ 2008-299673

(51) Int. Cl.
  *B62D 25/08*  (2006.01)
  *B60R 19/34*  (2006.01)
(52) U.S. Cl. .............. 296/203.02; 296/187.09; 293/133; 293/155
(58) Field of Classification Search .................. 293/133, 293/155, 203.01, 203.02, 187.09, 187.1, 293/193.09; 296/203.01, 203.02, 187.09, 296/187.1, 193.09
See application file for complete search history.

(56) References Cited

U.S. PATENT DOCUMENTS

| | | | | |
|---|---|---|---|---|
| 6,598,933 B2 * | 7/2003 | Taguchi et al. | .......... | 296/203.02 |
| 7,469,956 B2 * | 12/2008 | Yasuhara et al. | .......... | 296/187.09 |
| 7,533,913 B2 * | 5/2009 | Bae | ............... | 293/133 |
| 7,651,155 B2 * | 1/2010 | Tan et al. | ................ | 296/187.03 |
| 7,900,964 B2 * | 3/2011 | Chretien et al. | .............. | 280/784 |

FOREIGN PATENT DOCUMENTS

| | | |
|---|---|---|
| JP | 62-123492 | 8/1987 |
| JP | 2001-233240 | 8/2001 |
| JP | 2005-112173 | 4/2005 |
| JP | 2007-185983 | 7/2007 |
| JP | 2007-190964 | 8/2007 |

* cited by examiner

*Primary Examiner* — Dennis Pedder
(74) *Attorney, Agent, or Firm* — Rankin, Hill & Clark LLP (57) ABSTRACT

Horizontally elongated member interconnects respective front end portions of a lower frame and a front side frame spaced apart from each other in a width direction of the vehicle body. Impact absorbing section is mounted on a substantially entire front surface of the horizontally elongated member, and a bumper beam is fixedly mounted to the front surface of the impact absorbing section. The impact absorbing section is a cylindrical member having a cross-sectional shape elongated in the width direction and having its outer side wall portion disposed generally on an imaginary extension line of an inner vertical wall portion of the lower frame.

3 Claims, 8 Drawing Sheets

FIG.7A
(KNOWN EXAMPLE)

FIG.7B
(INVENTIVE EMBODIMENT)

FRONT VEHICLE BODY STRUCTURE

FIELD OF THE INVENTION

The present invention relates to front vehicle body structures where a bumper beam is mounted to front side frames via extension members (impact absorbing sections).

BACKGROUND OF THE INVENTION

Among the conventionally-known types of front vehicle body structures are one where a load applied or input to a bumper beam is transmitted to front side frames, upper members, lower members, etc. by way of extension members or impact absorbing sections. Front vehicle body structures of that type are designed in accordance with a size and usage of the vehicle and in consideration of desired impact absorbing performance and impact transmitting performance. Examples of the front vehicle body structures of that type include one disclosed in Japanese Patent Application Laid-Open Publication No. 2005-112173 (hereinafter referred to as "patent literature 1") in which the impact absorbing sections are provided on front end portions of the left and right front side frames, and one disclosed in Japanese Patent Application Laid-Open Publication No. 2007-190964 (hereinafter referred to as "patent literature 2") in which the impact absorbing sections are provided on front end portions of both the front side frames and the lower frames.

More specifically, in the front vehicle body structure disclosed in patent literature 1, the extension member or impact absorbing section, provided on each of the left and right sides of the vehicle body, extends to the neighborhood of the rear side of the bumper so that an impact input to the bumper beam at the time of a frontal collision can be transmitted quickly to the vehicle body framework so as to enhance the impact absorbing performance. However, whereas this front vehicle body structure can perform stable load absorbing and load transmitting performance with respect to a load applied in a front-rear (or axial) direction of the vehicle body, it can not perform appropriate load absorbing and load transmitting performance with respect to a load applied at an oblique angle to the bumper beam (and hence the impact absorbing sections) because the impact absorbing sections would fall down or collapse due to the obliquely applied load. Collapsing of the impact absorbing sections may be prevented by increasing the wall thickness of the impact absorbing sections. However, increasing the wall thickness of the impact absorbing sections would not only increase rigidity of the impact absorbing sections and thus prevent preferred behavior of the impact absorbing sections, but also increase the weight and manufacturing cost of the front body structure and hence the vehicle.

In the front vehicle body structure disclosed in patent literature 2, the impact absorbing section, provided on each of the left and right sides of the vehicle body, and comprises two (i.e., inner and outer) impact absorbing parts that are provided on the front end surfaces of both the front side frame and the lower frame, and the bumper beam is provided on the front surfaces of these impact absorbing parts. With such two-part impact absorbing sections, this front vehicle body structure can operate effectively by reliably preventing the impact absorbing sections from collapsing against loads input from many directions, particularly against a load input to the bumper beam at an oblique angle relative to the front surface of the bumper beam and hence the impact absorbing sections. However, the impact absorbing sections tend to be complicated in structure. Further, in countries where there are only a few vehicles greater in size than the vehicle employing the aforementioned front vehicle body structure, there is often no particular need to provide the two-part impact absorbing sections in order to secure a great crushing load (energy absorbing amount) of the impact absorbing sections.

SUMMARY OF THE INVENTION

The present invention is directed toward a front vehicle body structure that can achieve appropriate impact absorbing performance even with respect to a load input obliquely to the impact absorbing sections and that is simple in construction and, thus, can be mounted to the vehicle body with ease.

The present invention provides a front vehicle body structure including, on each of left and right sides thereof, a front side frame, a front pillar, a lower frame, a connection member, and an impact absorbing section. The front side frame extends in a front-rear direction of a vehicle body. The front pillar is disposed outwardly of the front side frame and is provided behind the front side frame. The lower frame extends forward from a lower end portion of the front pillar. The connection member extends in a width direction of the vehicle body to interconnect respective front end portions of the front side frame and the lower frame, which are spaced apart from each other in a width direction of the vehicle body. The impact absorbing section is mounted on a substantially entire front surface of the connection member. A bumper beam is fixedly mounted to a front surface of the impact absorbing section, which is formed as a cylindrical member having a cross-sectional shape elongated in the width direction of the vehicle body. The impact absorbing section has an outer side wall portion thereof disposed generally on an imaginary extension line of an inner vertical wall portion of the lower frame.

Because the impact absorbing section in the present invention is in the form of a cylindrical member having a polygonal cross-sectional shape elongated in the width direction of the vehicle body, the impact absorbing section can be reliably prevented from collapsing even against a load applied or input at an oblique angle inclined in the width direction of the vehicle body. Thus, the front vehicle body structure of the present invention can achieve appropriate impact absorbing performance even when a load has been input obliquely to the bumper beam and hence the impact absorbing section.

Further, the impact absorbing section (one-part impact absorbing section) in the present invention can be simplified in construction and can be mounted to the vehicle body with ease as compared to the aforementioned two-part impact absorbing section in the conventional front vehicle body structure. Further, because the impact absorbing section in the present invention has less edge lines than the two-part impact absorbing section, it can crush more easily to achieve appropriate energy absorbing performance.

Furthermore, the impact absorbing section, constructed as the cylindrical member having a polygonal cross-sectional shape elongated in the width direction of the vehicle body, can achieve an increased area moment of inertia, and thus, it is possible to secure a greater crushing load (i.e., energy absorbing amount) of the impact absorbing section. Furthermore, with the outer side wall portion of the impact absorbing section disposed on an imaginary extended line of the vertical wall portion of the lower frame, the front vehicle body structure of the present invention allows a portion of a load input to the bumper beam to be efficiently distributed to the lower frame as well.

Preferably, the impact absorbing section of the front vehicle body structure of the present invention comprises inner and outer channel-shaped members, and respective upper joint portions and lower joint portions of the inner and outer channel-shaped members are overlappingly fixedly joined with each other in such a manner that overlapping joined portions of the inner and outer channel-shaped members are offset from the centerline, extending in the front-rear direction, of the impact absorbing section toward a widthwise middle of the vehicle body. Thus, the overlapping joint portions having an increased strength can be located close to the front side frame, so that a load input to the bumper beam can be transmitted preferentially to the front side frame having a relatively great strength.

Desirably, the impact absorbing section includes a partition wall disposed generally on an imaginary extension line of an outer side wall portion of the front side frame so as to increase an energy absorbing amount, in the front-rear direction, of the impact absorbing section. With the partition wall disposed generally on the imaginary extension line of the outer wall of the front side frame, a load input to the bumper beam can be transmitted directly to the outer wall of the front side frame via the partition wall, and thus, it is possible to increase the load transmitting efficiency. Further, the partition wall extends in the front-rear direction of the vehicle body so as to increase the energy absorbing amount, in the front-rear direction, of the impact absorbing section. Thus, if the impact absorbing section is formed to have a generally rectangular cross-sectional shape and a length or width of the cross section is defined as a buckling wavelength, it is possible to create an energy absorbing region within the range of the buckling wavelength, so that the energy absorbing amount of the impact absorbing section can be increased. Furthermore, the provision of such a partition wall can reduce the buckling wavelength of the impact absorbing section and thus achieve uniform energy absorption.

Preferably, the partition wall has a plurality of corner portions as viewed in the cross section of the impact absorbing section and defines a closed polygonal cross section in conjunction with the inner channel-shaped member. Thus, the partition wall can have an increased numbe of edges lines, so that the impact absorbing section can even further enhance the impact absorbing effect.

In a preferred form, the partition wall includes upper and lower wall portions joined to the inner channel-shaped member or the outer channel-shaped member in such a manner that the upper and lower wall portions are overlappingly fixed to the overlapping joined portions. Thus, it is possible to increase the strength of a portion of the impact absorbing section adjacent to the front side frame. As a result, the impact absorbing section allows an input load to be efficiently transmitted to the front side frame with an even further enhanced efficiency.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Whereas the following describe the basic principles of a front vehicle body structure of the present invention only in relation to a left front side of a vehicle body, it should be appreciated that the basic principles of the front vehicle body structure are also applicable to a right front side of the vehicle body.

Figure 1:
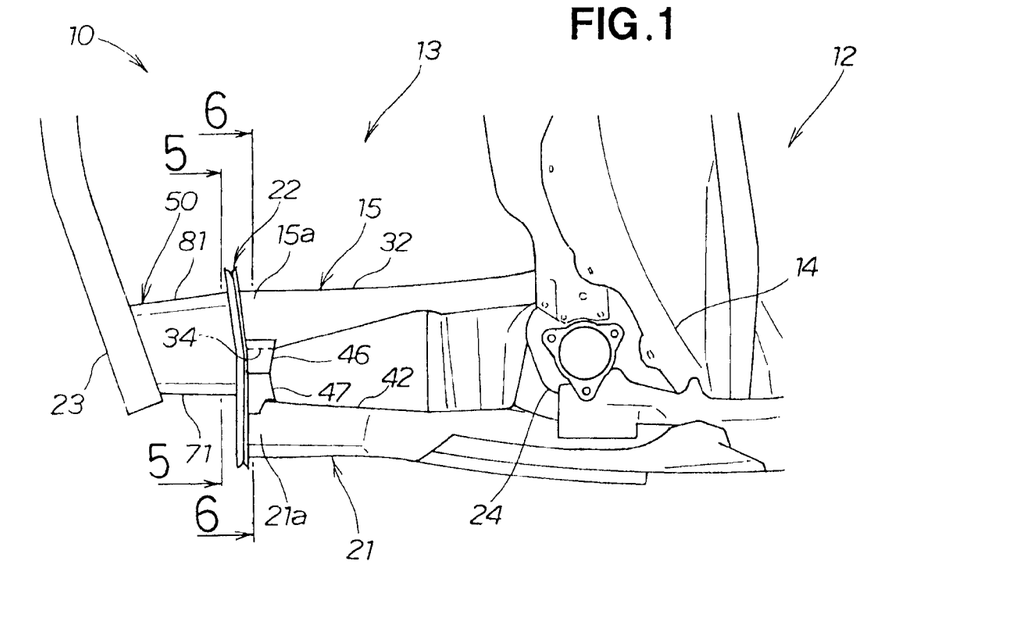
FIG. 1 a plan view of a vehicle body employing a first embodiment of a front vehicle body structure of the present invention.
Figure 2:
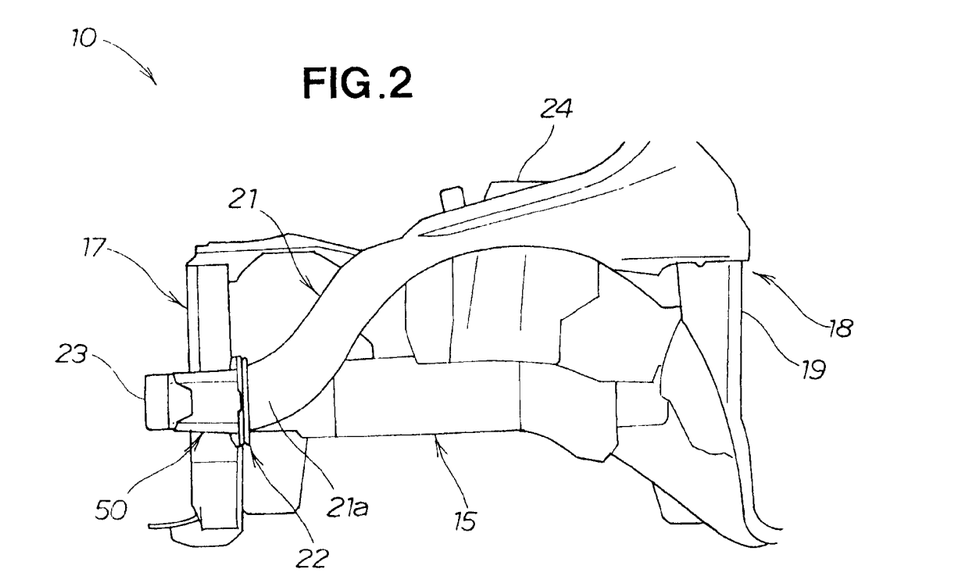
FIG. 2 is a side view of a vehicle body shown in FIG. 1.
Figure 3:
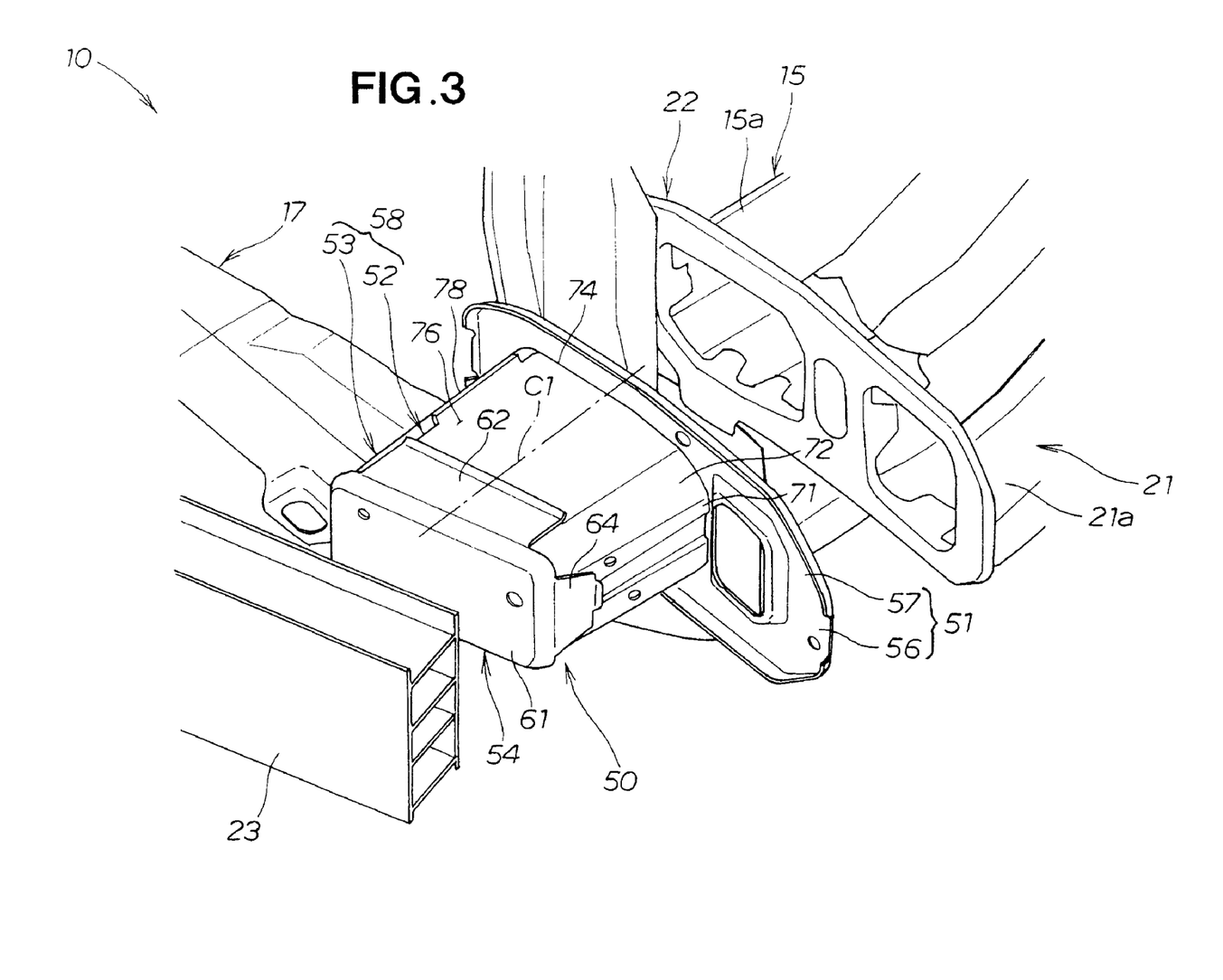
FIG. 3 is an exploded perspective view of the front vehicle body structure.

FIG. 1 is a plan view of a vehicle body employing a first embodiment of the front vehicle body structure of the present invention, FIG. 2 is a side view of the vehicle body shown in FIG. 1, and FIG. 3 is an exploded perspective view of the front vehicle body structure.

The front vehicle body structure 10 includes: a lower dashboard panel 14 partitioning between a passenger compartment 12 and an engine compartment 13; a front side frame 15 extending in a front-rear direction of the vehicle body; a front bulkhead 17 (FIG. 2) provided around a front end portion 15a of the front side frame 15 and supporting a radiator (not shown) and a battery; a front pillar 18 disposed behind the front side frame 15 and located in an outside region, in the width direction of the vehicle body, of the front vehicle body structure; a lower frame 21 disposed outwardly of the front side frame 15 in the width direction of the vehicle body; and a connection bracket 22 interconnecting respective front end portions 21a and 15a of the lower frame 21 and the front side frame 15 spaced apart from each other in the width direction of the vehicle body. The front vehicle body structure 10 further includes: an impact absorbing section (or extension member) 50 provided on the front surface of the connection bracket 22 for not only transmitting an input load but also absorbing the input load; a bumper beam 23 provided on the front surface of the impact absorbing section 50; and a damper housing 24 spanning between the lower frame 21 and the front side frame 15 and supporting a front damper (not shown).

The connection bracket 22 is a horizontally elongated connection member 22 extending in the width direction of the vehicle body to interconnect the respective front end portions 21a and 15a of the lower frame 21 and the front side frame 15 spaced apart from each other in the width direction of the vehicle body.

Figure 4:
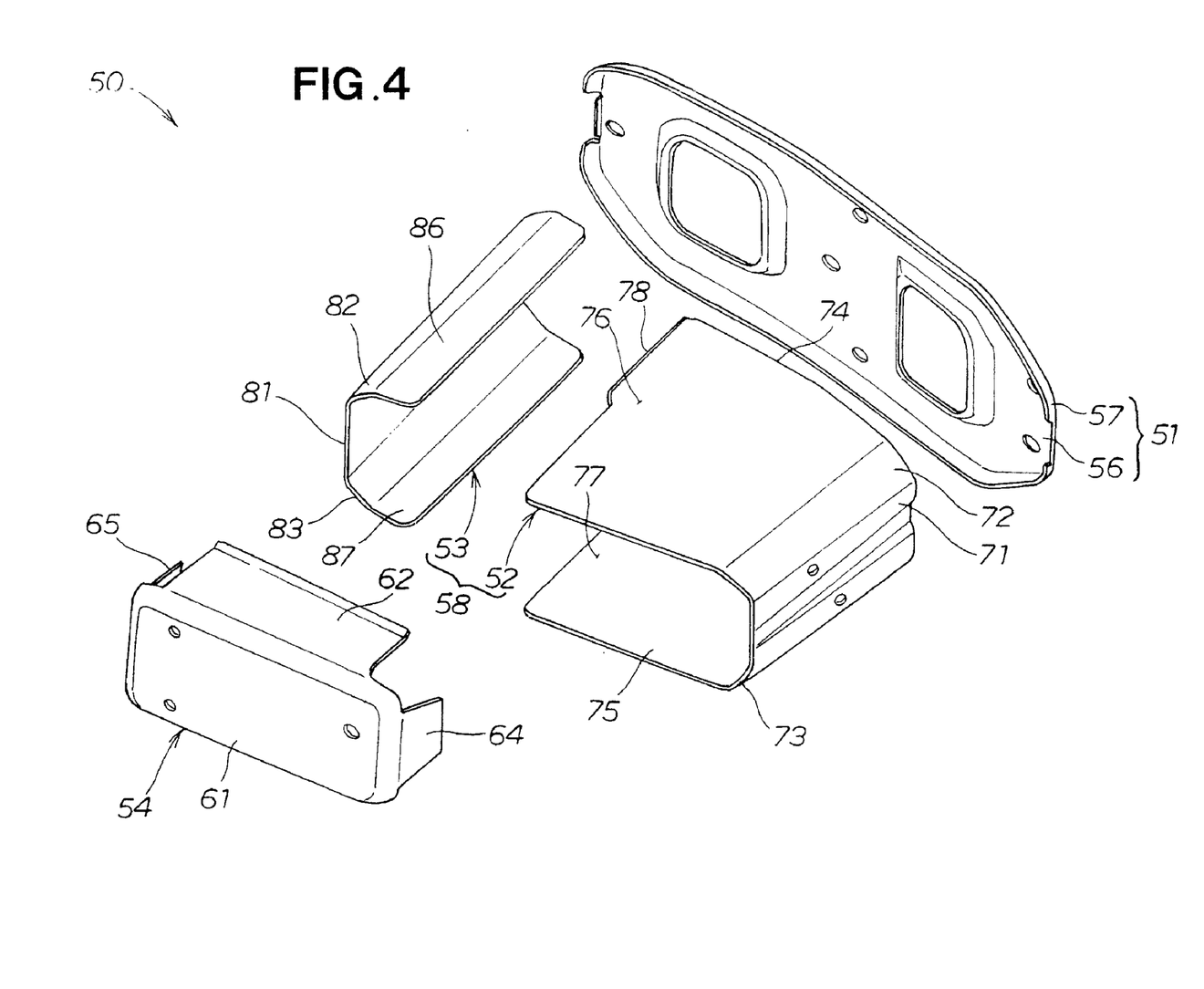
FIG. 4 is an exploded perspective view of an impact absorbing section employed in the front vehicle body structure shown in FIG. 3.
Figure 5:
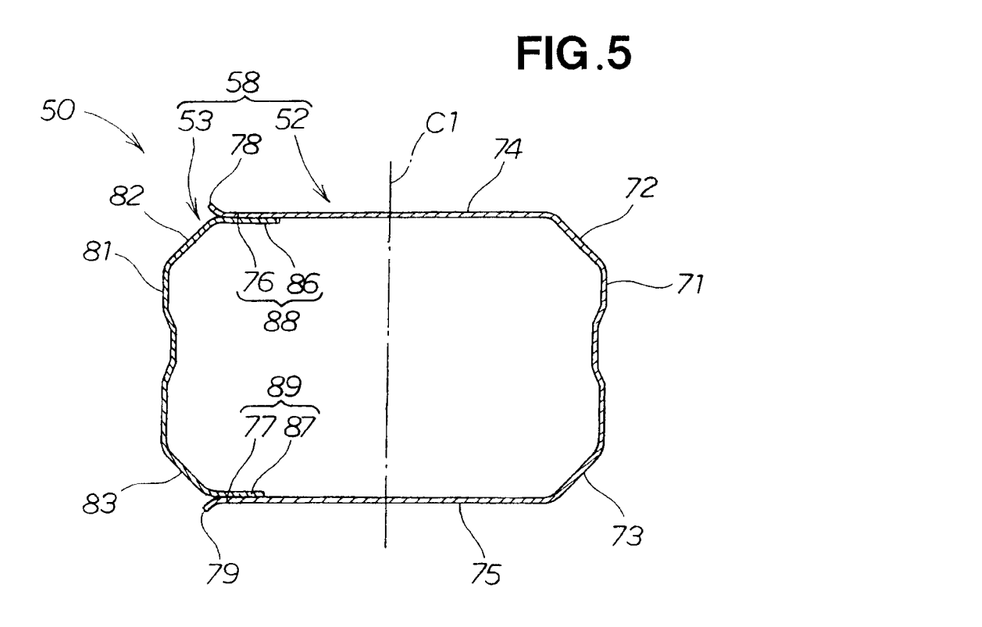
FIG. 5 is a sectional view taken along line 5-5 of FIG. 1.
Figure 6:
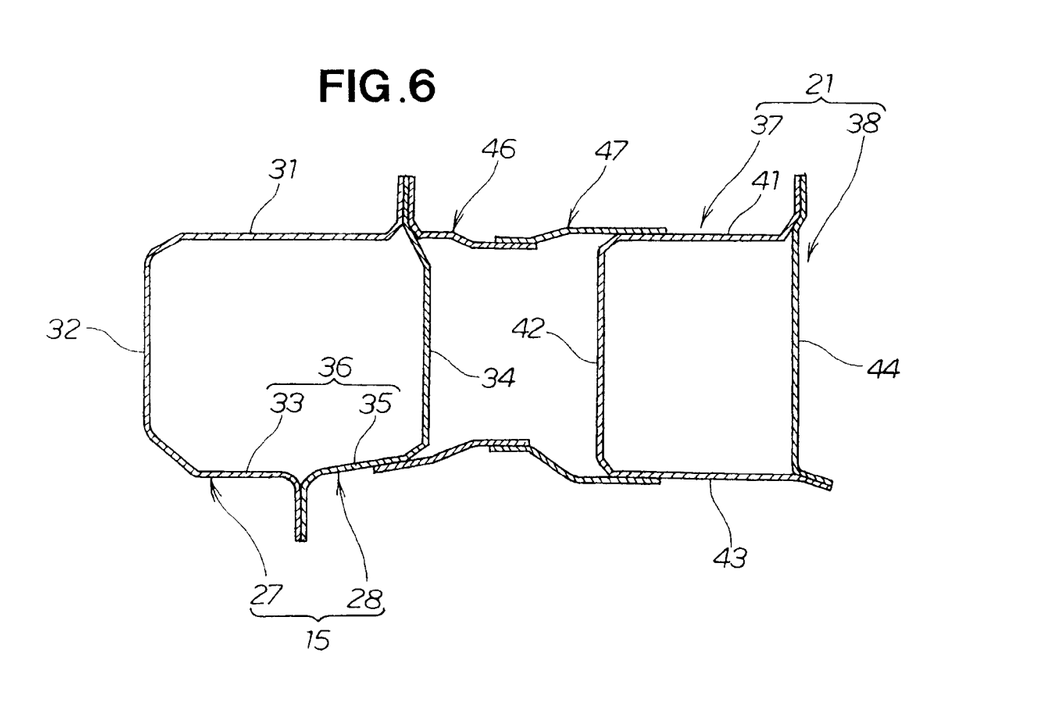
FIG. 6 is a sectional view taken along line 6-6 of FIG. 1.

FIG. 4 is an exploded perspective view of the impact absorbing section 50 employed in the front vehicle body structure 10 shown in FIG. 3, FIG. 5 is a sectional view taken along the 5-5 line of FIG. 1, and FIG. 6 is a sectional view taken along the 6-6 line of FIG. 1.

As shown in FIG. 6, the front side frame 15 comprises inner and outer members 27 and 28 fixedly joined with each other in a manner to be detailed hereinafter. The inner member 27 has an upper wall portion 31, an inner wall portion 32 and an inner lower wall portion 33, and the outer member 28 has an outer side wall portion 34 and a lower wall portion 35. The inner lower wall portion 33 and the outer lower wall portion 35 together constitute a lower wall 36.

As also shown in FIG. 6, the lower frame 21 comprises inner and outer panels 37 and 37 fixedly joined with each other, and the inner panel 37 has an upper wall portion 41, an inner vertical wall portion 42 and a lower wall portion 43 while the outer panel 38 has an outer vertical wall portion 44.

Further, the front side frame 15 has a front-side-frame connection bracket 46 extending toward the lower frame 21, and the lower frame 21 has a lower-frame connection bracket 47 extending toward the front side frame 15. These connection brackets 46 and 47 are connected together to interconnect the front end portion 21a of the lower frame 21 and the front end portion 15a of the front side frame 15.

As shown in FIG. 4, the impact absorbing section 50 includes: a base section 51 connected to the connection bracket 22; an outer channel-shaped member 52 extending forward from the base section 51; an inner channel-shaped member 53 extending forward from the base section 51; and a lid member 54 provided on and cover the front ends of the outer and inner channel-shaped members 52 and 53.

The base section 51 includes a body portion 56 fixedly joined to the connection bracket 22, and a flange portion 57 formed on and along the outer periphery of the body portion 56. The outer and inner channel-shaped members 52 and 53 together constitute a cylindrical member 58 of a polygonal cross-sectional shape elongated in the width direction of the vehicle body.

The lid member 54 includes: a lid body 61 having the bumper beam 23 fixedly joined thereto; an upper joint portion 62 bent from the lid body 61 to be fixedly joined to the cylindrical member 58 having a polygonal cross-sectional shape elongated in the width direction of the vehicle body; a lower joint portion (not shown) bent from the lid body 61 to be fixedly joined to the cylindrical member 58; an outer joint portion 64 bent from the lid body 61 to be fixedly joined to the cylindrical member 58; and an inner joint portion 65 bent from the lid body 61 to be fixedly joined to the cylindrical member 58.

The outer channel-shaped member 52 has an outer side wall portion 71 located in an outside region (in the width direction of the vehicle body) thereof, upper and lower wall portions 74 and 75 bent inward from the outer side wall portion 71 along upper and lower corner portions 72 and 73, and upper and lower joint portions 76 and 77 provided on upper and lower wall portions 74 and 75 and joined to the inner channel-shaped member 53.

As shown in FIG. 1, the outer side wall portion 71 of the outer channel-shaped member 52 is disposed along the inner vertical wall portion 42 of the lower frame 21. The upper corner portion 72 defines a chamfered surface between the outer side wall portion 71 and the upper wall portion 74, while the lower corner portion 73 defines a chamfered surface between the outer side wall portion 71 and the lower wall portion 75.

The upper and lower joint portions 76 and 77 have upper and lower guide surfaces 78 and 79, respectively, slanting away from each other to facilitate fitting attachment, to the inner channel-shaped member 53, of the outer channel-shaped member 52.

The inner channel-shaped member 53 has an inner side wall portion 81 located in an inside region (in the width direction of the vehicle body) thereof, and upper and lower joint portions 86 and 87 bent outwardly along upper and lower corner portions 82 and 83 to be fixedly joined to the outer channel-shaped member 52.

As also shown in FIG. 1, the inner side wall portion 81 of the inner channel-shaped member 53 is disposed along an inner wall portion 32 of the front side frame 15. The upper corner portion 82 defines a chamfered surface between the inner side wall portion 81 and the upper joint portion 86, while the lower corner portion 83 defines a chamfered surface between the inner side wall portion 81 and the lower joint portion 87.

The upper joint portion 76 of the outer channel-shaped member 52 and the upper joint portion 86 of the inner channel-shaped member 53 together constitute an upper overlapping joint portion 88, and the lower joint portion 77 of the outer channel-shaped member 52 and the lower joint portion 87 of the inner channel-shaped member 53 together constitute a lower overlapping joint portion 89. These overlapping joint portions 88 and 89 are offset from a centerline C1 of the cylindrical member 58 toward a widthwise middle of the vehicle body, i.e. toward the front side frame 15 having a relatively great strength.

Figure 7A:
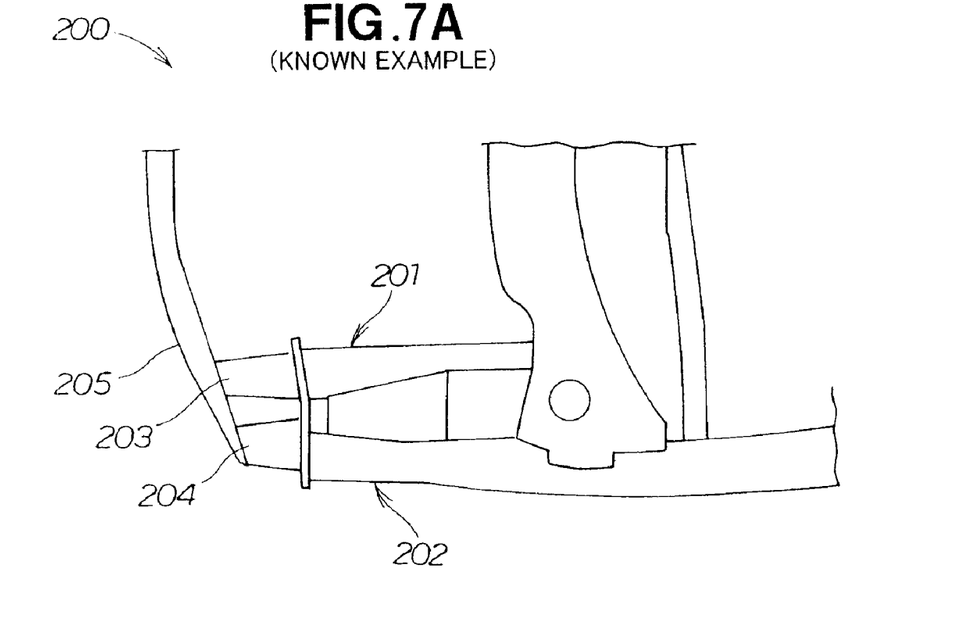
FIGS. 7A and 7B are diagrams comparing the embodiment of the front vehicle body structure of the present invention to a comparative conventional example.
Figure 7B:
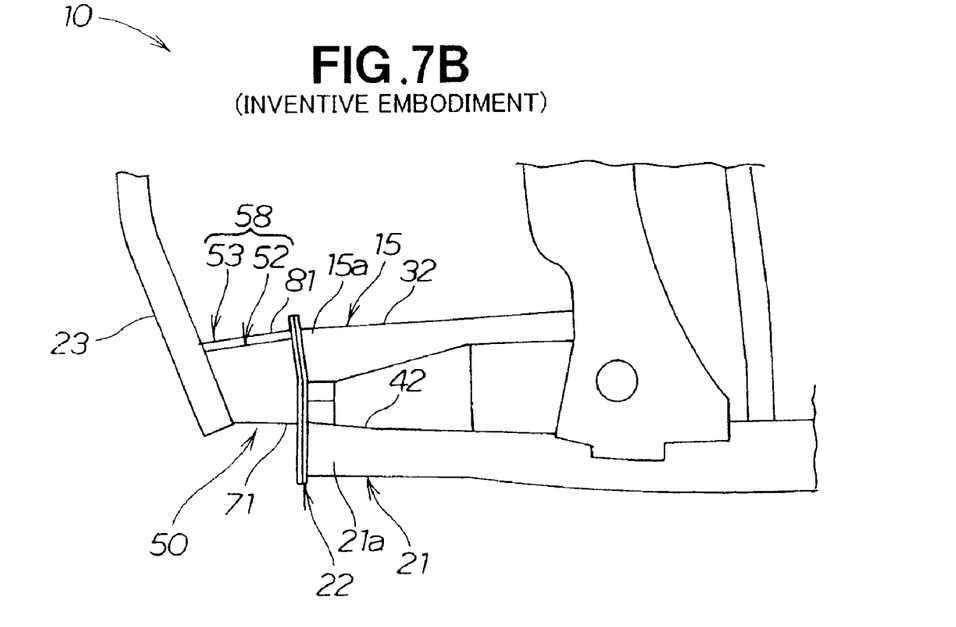

FIGS. 7A and 7B are diagrams comparing the aforementioned first embodiment of the front vehicle body structure of the present invention to a comparative conventional example. In a comparative conventional example of a front vehicle body structure (i.e., conventional front vehicle body structure) 200 shown in FIG. 7A, a two-part impact absorbing section (extension member) comprising an inner impact absorbing part 203 and an outer inner impact absorbing part 204 is provided on a front end portion of a front side frame and on a front end portion of a lower frame 202, and a bumper beam 205 is provided on the front surfaces of the inner and outer impact absorbing parts 203 and 204. With this arrangement, this conventional front vehicle body structure 200 can operate effectively against any loads input from many directions, particularly by reliably preventing the impact absorbing parts 203 and 204 from collapsing due to a load input to the bumper beam 205 at an oblique angle relative to the front surface of the bumper beam 205.

However, the impact absorbing parts 203 and 204 in the conventional front vehicle body structure 200 tend to be complicated in construction. Further, in countries where there are only a few vehicles greater in size than the vehicle employing the front vehicle body structure 200, there is often no particular need to provide such a two-part impact absorbing section so as to secure a great crushing load (energy absorbing amount).

FIG. 7B shows the embodiment of the front vehicle body structure 10 of the present invention. In the embodiment of the front vehicle body structure 10, the front side frame 15 extends in the front-rear direction of the vehicle body, the front pillar 18 is disposed behind the front side frame 15, and the lower frame 21 is disposed outwardly of the front side frame 15 in the width direction of the vehicle body and extends from a lower end portion 19 of the front pillar 18. Further, the connection bracket 22 extends in the width direction of the vehicle body to interconnect the respective front end portions 21a and 15a of the lower frame 21 and the front side frame 15 spaced from each other in the width direction of the vehicle body, and the impact absorbing section (which may be called "one-part impact absorbing section") 50 is mounted on a substantially entire front face of the connection bracket 22.

Because the impact absorbing section 50 is constructed as the cylindrical member 58 having a polygonal cross-sectional shape elongated in the width direction of the vehicle body, the impact absorbing section 50 can be reliably prevented from collapsing even against a load applied or input at an oblique angle inclined in the width direction of the vehicle body. Thus, the embodiment of the front vehicle body structure 10 can achieve appropriate impact absorbing performance even when a load has been input at an oblique angle that is inclined in the width direction of the vehicle body.

For example, the impact absorbing section (one-part impact absorbing section) 50 in the embodiment can be simplified in construction and can be mounted to the vehicle body with ease as compared to the aforementioned two-part impact absorbing section in the conventional front vehicle body structure 200. Further, because the impact absorbing section 50 has less edge lines than the two-part impact absorbing section, it can crush more easily, so that the embodiment of the front vehicle body structure 10 can achieve appropriate energy absorbing performance.

Furthermore, the impact absorbing section 50 constructed as the cylindrical member 58 having a polygonal cross-sectional shape elongated in the width direction of the vehicle body can achieve an increased area moment of inertia as compared to an impact absorbing section in the form of a mere circular cylinder, and thus, it is possible to secure a greater crushing load (i.e., energy absorbing amount) of the impact absorbing section 50.

Furthermore, the outer side wall portion 71 of the impact absorbing section 50 is disposed generally on an imaginary extension line of the inner vertical wall portion 42 of the lower frame 21, and thus, the embodiment of the front vehicle body structure 10 allows a portion of a load input to the bumper beam 23 to be efficiently distributed to the lower frame 21 as well.

In the embodiment of the front vehicle body structure 10, as shown in FIG. 5, the impact absorbing section 50 comprises the inner channel-shaped member 53 and the outer channel-shaped member 52, and the respective upper and lower joint portions 76 and 86 and 77 and 87 are overlappingly fixedly joined with each other in such a manner that the overlapping joint portions 88 and 89 are offset from the centerline C1 of the cylindrical member 58 toward the widthwise middle of the vehicle. Thus, the overlapping joint portions 88 and 89 having an increased strength can be located close to the front side frame 15, so that a load input to the bumper beams 23 can be transmitted preferentially to the front side frame 15 having a relatively great strength.

Figure 8:
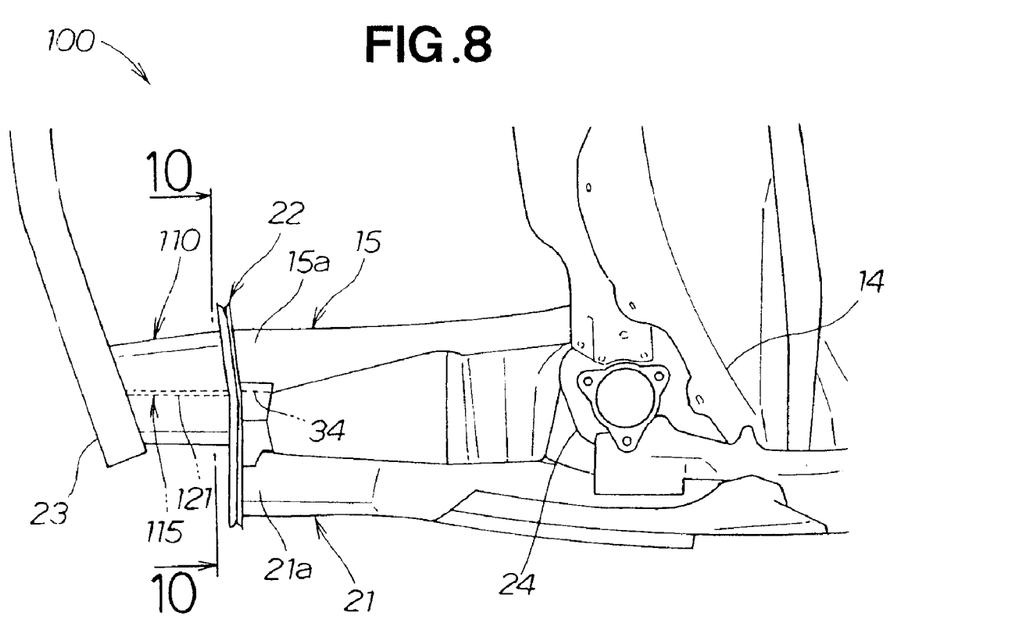
FIG. 8 is a plan view of a vehicle body employing a second embodiment of the front vehicle body structure of the present invention.

FIG. 8 is a plan view of a vehicle body employing a second embodiment of the front vehicle body structure 100 of the present invention, in which similar elements to those in the first embodiment are indicated by the same reference numerals as used for the first embodiment and will not be described here to avoid unnecessary duplication.

The front vehicle body structure 100 includes: the lower dashboard panel 14; the front side frame 15; the front bulkhead 17 (see FIG. 2); the front pillar 18; the lower frame 21; the connection bracket 22; an impact absorbing section (or extension member) 110 provided on the front surface of the connection bracket 22 for not only transmitting an input load but also absorbing the input load; the bumper beam 23 provided on the front surface of the impact absorbing section 100; and the damper housing 24.

Figure 9:
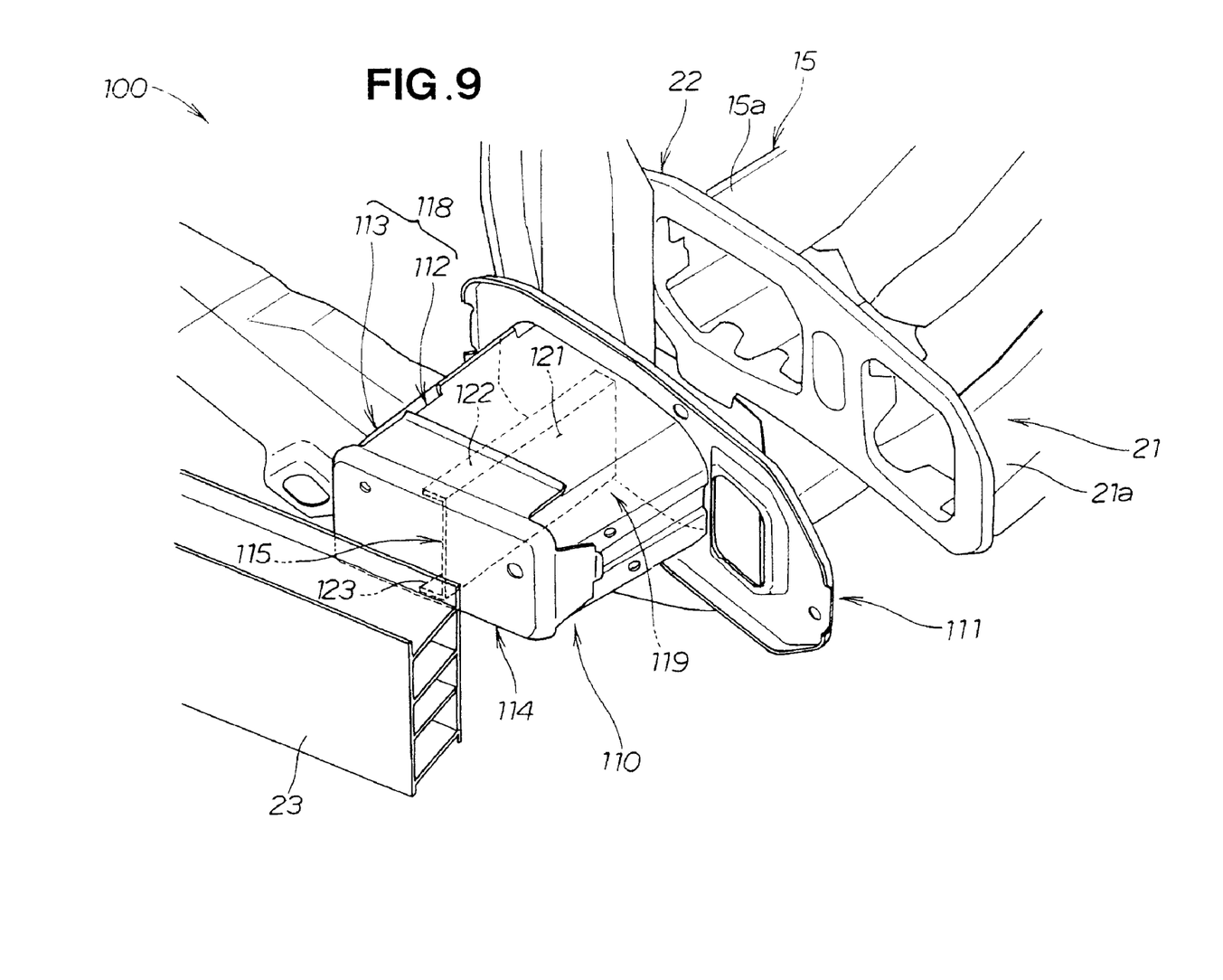
FIG. 9 is an exploded perspective view of an impact absorbing section of the front vehicle body structure shown in FIG. 8.
Figure 10:
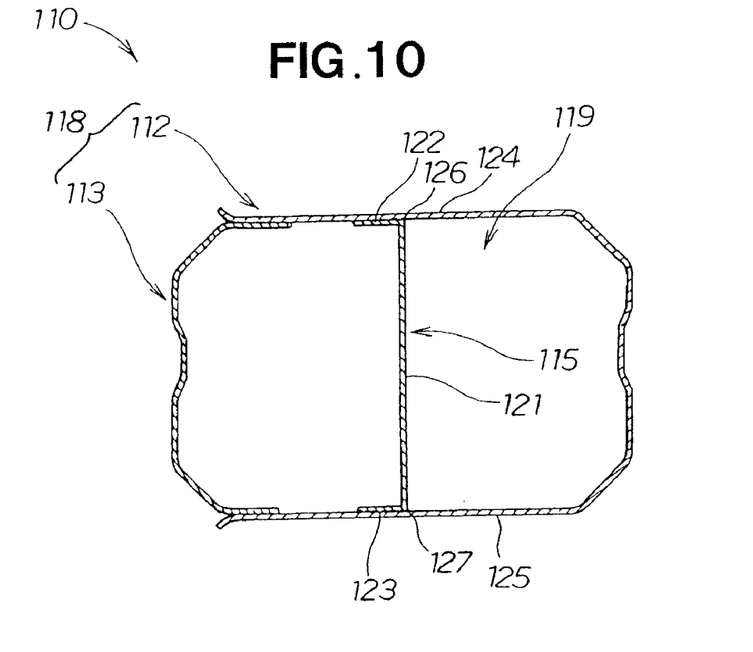
FIG. 10 is a sectional view taken along line 10-10 of FIG. 8.

FIG. 9 is an exploded perspective view of the impact absorbing section 110 of the front vehicle body structure 100 shown in FIG. 8, and FIG. 10 is a sectional view taken along the 10-10 line of FIG. 8.

The impact absorbing section 110 in the second embodiment includes: a base section 111 connected to the connection bracket 22; an outer channel-shaped member 112 extending forward from the base section 111; an inner channel-shaped member 113 extending forward from the base section 111; a lid member 114 provided on the front ends of the outer and inner channel-shaped members 112 and 113; and a partition wall (bulkhead) 115 extending in the front-rear direction of the vehicle body to partition an interior space 119, defined by the base section 111, outer and inner channel-shaped members 112 and 113 and lid member 114, in the width direction of the vehicle body.

The outer and inner channel-shaped members 112 and 113 together constitute a cylindrical member 118 having a polygonal cross-sectional shape elongated in the width direction of the vehicle body. Note that the base section 111, outer and inner channel-shaped members 112 and 113 and lid member 114 in the second embodiment 100 are constructed generally identically to the base section 51, outer and inner channel-shaped members 52 and 53 and lid member 54 in the above-described first embodiment 10.

The partition wall (bulkhead) 115 includes a partition wall body 121 extending in the front-rear direction of the vehicle body to partition the interior space 119 in the width direction of the vehicle body, and upper and lower wall portions 122 and 123 bent inwardly from the partition wall body 121 and fixedly joined to upper and lower wall portions 124 and 125, respectively, of the outer channel-shaped member 112. The partition wall 115 has two corner portions (edge lines) 126 and 127 as viewed in section. The partition wall body 121 of the partition wall 115 is disposed generally on an imaginary extension line of the outer side wall portion of the front side frame 15.

With the second embodiment of the front vehicle body structure 100, the partition wall body 121 of the partition wall 115 is disposed generally on the imaginary extension line of the outer side wall portion 34 of the front side frame 15 as set forth above, a load input to the bumper beam 23 can be transmitted directly to the outer side wall portion 34 of the front side frame 15 via the partition wall 115, and thus, it is possible to increase the load transmitting efficiency.

Further, the partition wall 115 extends in the front-rear direction of the vehicle body so as to increase the energy absorbing amount, in the front-rear direction, of the impact absorbing section 110. Thus, if the impact absorbing section 110 is formed to have a generally rectangular cross-sectional shape (taken perpendicularly to the buckling direction of the impact absorbing section 110) and a length or width of the cross section is defined as a buckling wavelength, it is possible to create an energy absorbing region within the range of the buckling wavelength, so that the energy absorbing amount of the impact absorbing section 110 can be increased. Furthermore, the provision of such a partition wall 115 can reduce the buckling wavelength of the impact absorbing section 110 and thus achieve uniform energy absorption.

Figure 11:
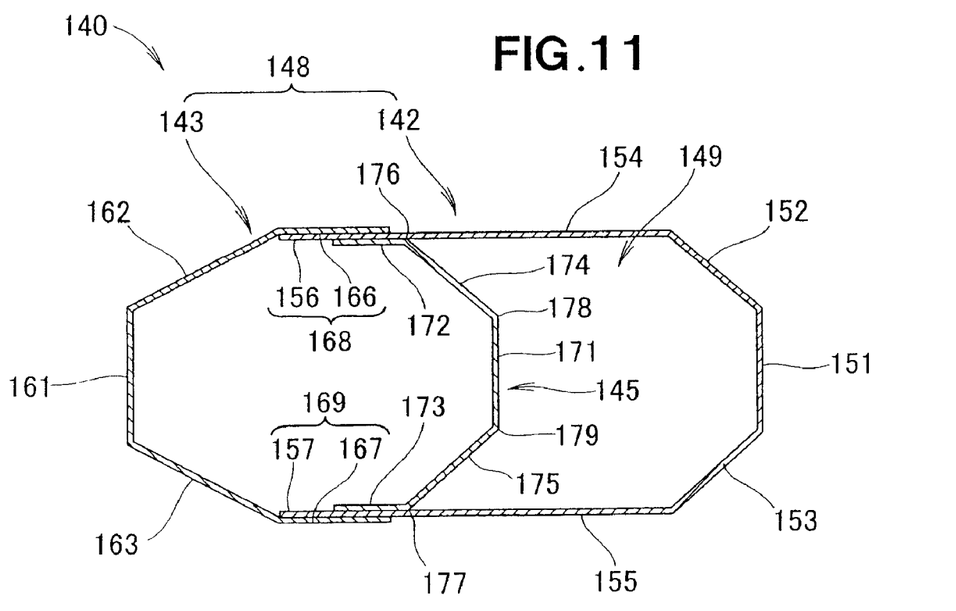
FIG. 11 is a sectional view of a modified example of the second embodiment of the impact absorbing section.

FIG. 11 is a sectional view of a modification of the second embodiment of the impact absorbing section, in which similar elements to those in the above-described second embodiment 100 (see FIG. 9) are indicated by the same reference numerals as used for the second embodiment 100 and will not be described here to avoid unnecessary duplication.

The modified impact absorbing section 140 of FIG. 11 includes: a base section constructed identically to the base section 111 of FIG. 9; an outer channel-shaped member 142 extending forward from the base section; an inner channel-shaped member 143 extending forward from the base section; a lid member constructed identically to the lid member 114 of FIG. 9; and a partition wall (bulkhead) 145 extending in the front-rear direction of the vehicle body to partition an interior space 149, defined by the base section, outer and inner channel-shaped members 142 and 143 and lid member, in the width direction of the vehicle body.

The outer and inner channel-shaped members 142 and 143 together constitute a cylindrical member 148 having a polygonal cross-sectional shape elongated in the width direction of the vehicle body.

The outer channel-shaped member 142 has an outer side wall portion 151 located in an outside region (in the width direction of the vehicle body) thereof, upper and lower wall portions 154 and 155 bent inward from the outer side wall portion 151 along upper and lower corner portions 152 and 153, and upper and lower joint portions 156 and 157 joined to the inner channel-shaped member 143.

The inner channel-shaped member 143 has an inner side wall portion 161 located in an inside region (in the width direction of the vehicle body) thereof, and upper and lower joint portions 166 and 167 bent outwardly along upper and lower corner portions 162 and 163 to be fixedly joined to the outer channel-shaped member 142.

The upper joint portion 156 of the outer channel-shaped member 142 and the upper joint portion 166 of the inner channel-shaped member 143 together constitute an upper overlapping joint portion 168, and the lower joint portion 157 of the outer channel-shaped member 142 and the lower joint portion 167 of the inner channel-shaped member 143 together constitute a lower overlapping joint portion 169.

The partition wall (bulkhead) 145 includes: a partition wall body 171 extending in the front-rear direction of the vehicle body to partition the interior space 149 in the width direction of the vehicle body; upper and lower wall portions 172 and 173 bent inwardly from the partition wall body 171 and fixedly joined to the upper and lower joint portions 156 and 157, respectively, of the outer channel-shaped member 142; an upper corner portion 174 formed between the partition wall body 171 and the upper wall portion 172; and a lower corner portion 175 formed between the partition wall body 171 and the lower wall portion 173.

Because the upper and lower wall portions 172 and 173 of the partition wall 145 are fixedly joined to the upper and lower joint portions 156 and 157, respectively, of the outer channel-shaped member 142, it may be said that they are fixedly joined to the upper and lower overlapping joint portions 168 and 169.

Further, by the provision of the upper and lower corner portions 174 and 176, the partition wall 145 has a plurality of corners (edge lines) 176-179 as viewed in cross section and forms a closed polygonal sectional shape in conjunction with the inner channel-shaped member 143. The number of the corners (edge lines) 176-179 is greater than that of the partition wall 115 shown in FIG. 10. Thus, the modified impact absorbing section 140 can even further enhance the impact absorbing effect or performance.

With the partition wall 145 having the upper and lower wall portions 172 and 173 fixedly joined to the inner channel-shaped member 143 and overlappingly fixedly joined to the upper and lower overlapping joint portions 168 and 169, it is possible to increase the strength of a portion of the modified impact absorbing section 140 adjacent to the front side frame 15 (see FIG. 1). As a result, the modified impact absorbing section 140 allows an input load to be efficiently transmitted to the front side frame 15 with an even further enhanced efficiency.

Whereas the second embodiment of the front vehicle body structure of the present invention has been described above in relation to the case where only one partition wall 115 is provided in the impact absorbing section 110, a combination of a plurality of such partition walls 115 may be provided in the impact absorbing section 110. Further, a rib, hole and/or the like may be formed on or in the partition wall 115 to adjust the rigidity of the partition wall 115.

Further, whereas the upper and lower wall portions 172 and 173 of the partition wall 145 in the impact absorbing section 140 have been described as fixedly joined to the inner channel-shaped member 143, they may be fixedly joined to the outer channel-shaped member 142.

The front vehicle body structure of the present invention is well suited for application to passenger cars of a sedan type, wagon type, etc.

What is claimed is:

1. A front vehicle body structure comprising on each of left and right sides thereof:
   a front side frame extending in a front-rear direction of a vehicle body, a front pillar provided behind the front side frame, a lower frame being disposed outwardly of the front side frame and extending forward from a lower end portion of the front pillar;
   a connection member extending in a width direction of the vehicle body to interconnect respective front end portions of the lower frame and the front side frame spaced apart from each other in a width direction of the vehicle body; and
   an impact absorbing section mounted on a portion of a front surface of the connection member, a bumper beam being mounted to a front surface of the impact absorbing section, the impact absorbing section being in a form of a cylindrical member having a cross-sectional shape elongated in the width direction of the vehicle body and having an outer side wall portion thereof disposed generally on an imaginary extension line of an inner vertical wall portion of the lower frame,
   wherein the impact absorbing section comprises inner and outer channel-shaped members, and respective upper joint portions and lower joint portions of the inner and outer channel-shaped members are overlappingly fixedly joined with each other in such a manner that entire overlapping joined portions of the inner and outer channel-shaped members are offset from a centerline, extending in the front-rear direction, of the impact absorbing section toward a widthwise middle of the vehicle body, and
   wherein the impact absorbing section includes a partition wall disposed generally on an imaginary extension line of an outer side wall portion of the front side frame, extending in the front-rear direction of the vehicle body, to partition an interior space of the impact absorbing section in the width direction of the vehicle body.

2. The front vehicle body structure of claim 1, wherein the partition wall has a plurality of corner portions as viewed in the cross section of the impact absorbing section and defines a closed polygonal cross section in conjunction with the inner channel-shaped member.

3. The front vehicle body structure of claim 2, wherein the partition wall includes upper and lower wall portions fixedly joined to the inner channel-shaped member or the outer channel-shaped member in such a manner that the upper and lower wall portions are overlappingly fixed to the overlapping joined portions.

* * * * *